UNITED STATES PATENT OFFICE.

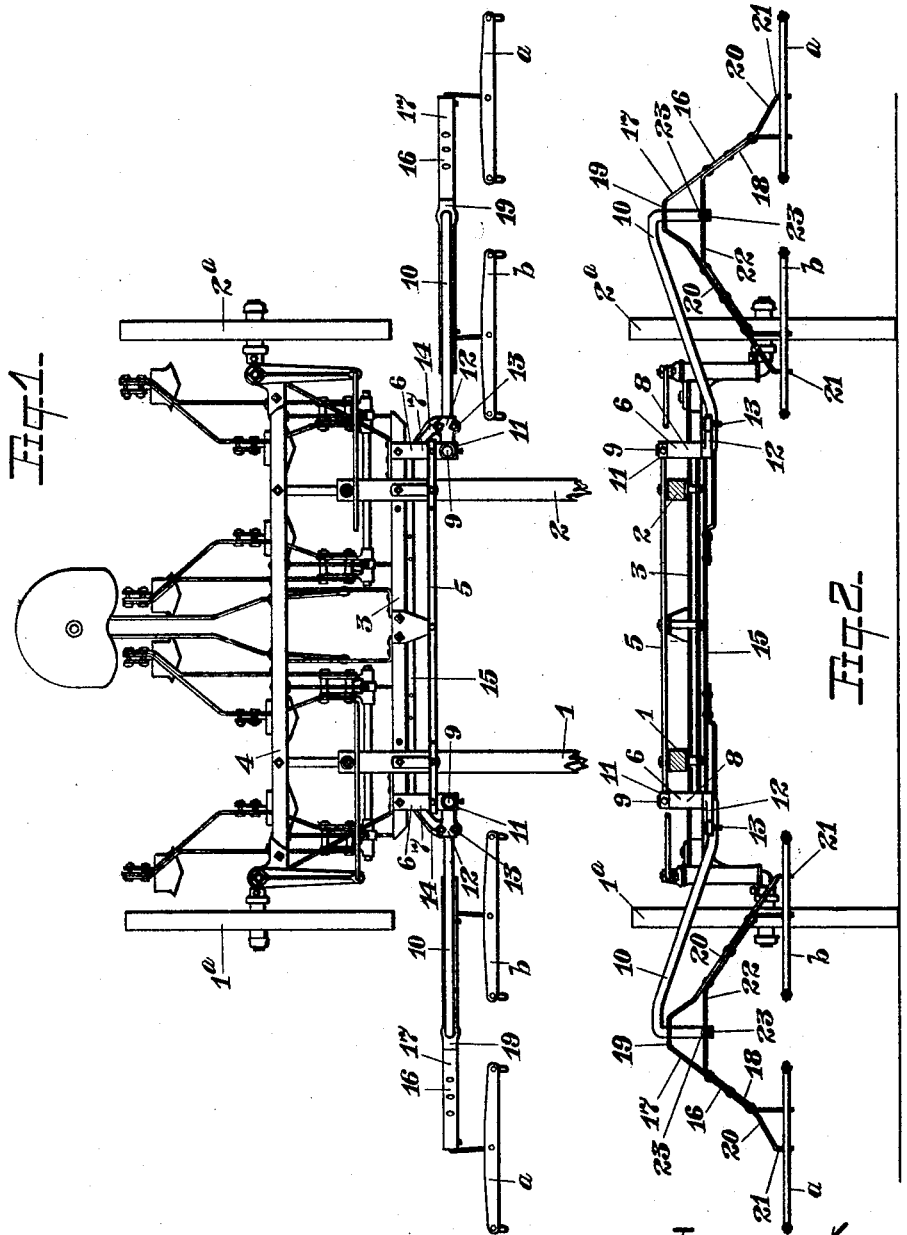

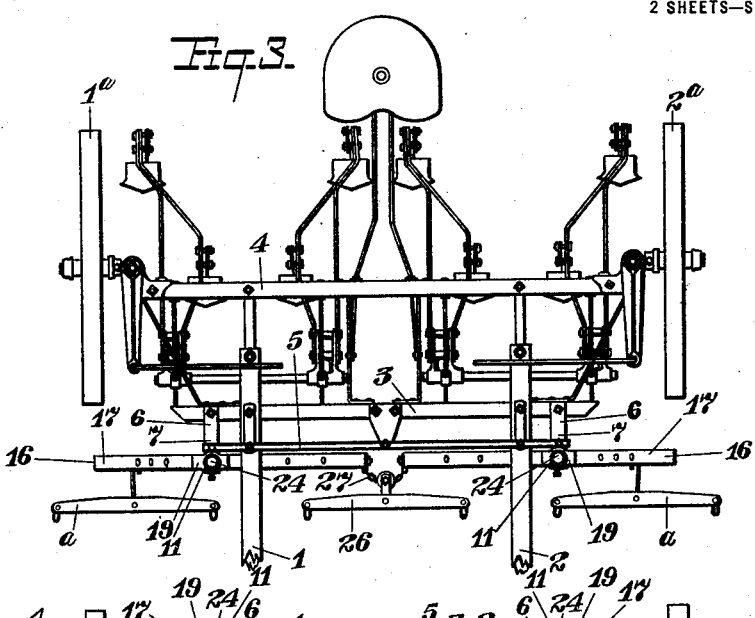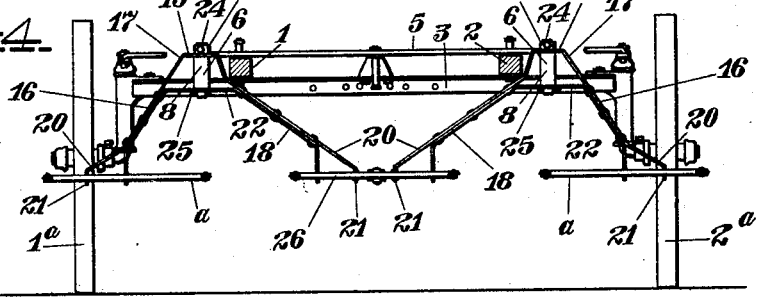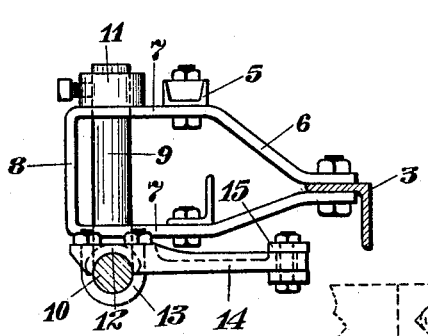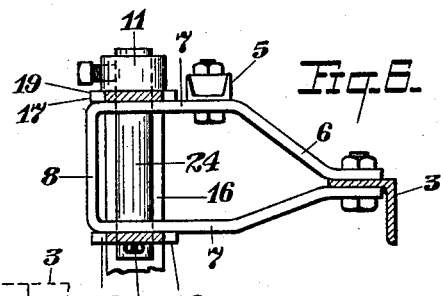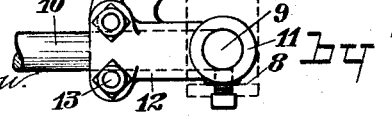

WESLEY A. PAUL, DECEASED, LATE OF MOLINE, ILLINOIS, BY LOLA V. PAUL, ADMINISTRATRIX, OF MOLINE, ILLINOIS, AND JOHN V. HOLSTEIN, OF MOLINE, ILLINOIS, ASSIGNORS TO DEERE AND COMPANY, OF MOLINE, ILLINOIS, A CORPORATION OF ILLINOIS.

CULTIVATOR.

1,318,583.      Specification of Letters Patent.      Patented Oct. 14, 1919.

Application filed February 7, 1916. Serial No. 76,749.

*To all whom it may concern:*

Be it known that WESLEY A. PAUL, deceased, a citizen of the United States, residing at the time of his demise at the city of Moline, in the county of Rock Island and State of Illinois, and JOHN V. HOLSTEIN, a citizen of the United States, residing at the city of Moline, in the county of Rock Island and State of Illinois, have invented certain new and useful Improvements in Cultivators, of which the following is a specification, reference being had therein to the accompanying drawing.

This invention relates to draft equalizers, particularly of that type adapted to be utilized for four or three horses as may be desired.

The object of the invention is to simplify as well as improve the construction and operation of such an equalizer without impairing its strength and efficiency.

Referring to the drawings in which similar numerals indicate identical parts—

Figure 1 is a plan view of a cultivator embodying the invention.

Fig. 2 is a front elevation of Fig. 1 with the cultivator shown only in part.

Fig. 3 is a plan view of a cultivator showing the invention applied thereto and adapted for three horses.

Fig. 4 is a front elevation of Fig. 3 with the cultivator shown only in part, and Figs. 5, 6, and 7 are enlarged details.

Draft poles 1 and 2 are mounted on a cultivator frame supported on wheels 1ª, and 2ª, and including a front bar 3 and a rear bar 4. Mounted rigidly on the poles 1 and 2 is a bar 5 having its ends projecting outside the poles 1 and 2 and secured to brackets 6 rigidly mounted on the bar 3. The brackets 6 are formed preferably of one piece bent to have forward parallel portions 7 joined by a vertical portion 8; the ends of the brackets converge rearwardly to the bar 3 to which they are rigidly secured. Journaled in the parallel portion 7 of the brackets 6 are the upwardly bent ends 9 of laterally and outwardly extending arms 10; from beneath the brackets 6 the arms 10 have an upward inclination to their outer portions which are bent downwardly. On the extremities of the ends 9 and above the brackets 6 is secured collars 11 which serve to hold the arms 10 in the brackets 6.

Bell-cranks are mounted on the arms 10 below the brackets 6, and have arms 12 extending along the arms 10 and secured rigidly thereon preferably by U bolts 13; the remaining arms 14 of the bell-cranks extend rearwardly and are pivotally connected to an equalizer bar 15. The outer ends of the arms 10 are bent downwardly forming pivotal supports for doubletrees 16. The doubletrees 16 are constructed preferably of flat metal bars and consist of upper and lower member 17 and 18; the members 17 have central horizontal portions 19 and diverging downwardly projecting portions 20, the ends 21 of the latter being vertical and having holes for the reception of whiffletree hooks. The members 18 have central horizontal portions 22 parallel to the portions 19 and spaced therefrom; from the portions 22 the members 18 diverge downwardly at the same angle as the portions 20 of the members 17, to which they are rigidly secured, their ends being bent vertically and spaced equidistant from the ends of the portions 20.

The doubletrees 16 are pivotally secured upon the downwardly bent ends of the arms 10 in the following manner, the portions 19 and 22 of the members 17 and 18 are provided with suitable perforations through which the downwardly bent ends of the arms 10 project, the extremities of the latter being perforated so that pins or cotters 23 can be inserted therein both above and below the portions 22 of the members 18, and so holding the doubletrees 16 securely in place.

As so far described the equalizer is adapted for four horses only, and it will be readily understood that by reason of the long leverage of the arms 10 and their connection with each other through the bell-cranks and the equalizing bar 15, the draft is extremely flexible, and the pull of one or both horses on one side of the cultivator is quickly met and equalized by the pull on the opposite side.

To adapt the device for three horses the collars 11 and U bolts 13 are removed so that the arms 10 can be detached from the brackets 6; the bell cranks and the equalizing bar 15 are also removed, and the arms 10 are disconnected from the doubletrees 16 by withdrawing the cotters 23; the brackets 6 are again utilized as a direct support for the doubletrees 16 which are secured thereon by pins 24, passing through the perforations in the doubletrees 16 and the brackets 6 provided for the ends of the arms 10, and held in place by the collars 11 secured thereon above the portions 19, and by cotters 25 in the lower ends of the pins 24 below the portions 22. The inner ends of the doubletrees 16 are now adjacent between the draft poles 1 and 2 and to them is attached a swingletree 26 by a chain 27 which is connected to the vertically bent inner ends 21 and passes around a pulley on the swingletree 26.

In Figs. 1 and 2 swingletrees are attached to the outer ends 21 of the doubletrees 16, and to the vertically bent inner ends of the members 18 are attached similar swingletrees b; when the change is made, however, for three horses, the swingletrees a are attached to the outer vertically bent portions of the member 18 and the swingletree 26 to the inner ends 21 of the doubletrees 16, as shown.

The doubletrees 16 being arch shaped, and the frame of the cultivator high, complete clearance is provided for rowed crops in an advanced stage of growth, in the cultivation of which the implement is used.

What is claimed is—

1. In a draft equalizer, the combination of a support, brackets on said support, laterally extended arms having vertical inner ends journaled in said brackets, the free ends of said arms being vertical and having draft devices pivotally supported thereon, and means connecting the inner end of one arm with the inner end of the opposite arm to cause a simultaneous movement of both arms when either of said arms is moved.

2. In a draft equalizer, the combination of a support, forwardly projecting brackets rigidly mounted on said support and having upper and lower parallel portions, laterally extended horizontally swinging arms having vertical inner ends journaled in said parallel portions, the free ends of said arms being vertical and having draft devices pivotally supported thereon, and means connecting the inner end of one arm with the inner end of the other arm to cause a simultaneous movement of both arms when either of said arms is moved.

3. In a draft equalizer, the combination of a support, brackets rigidly mounted thereon, arms adapted to swing horizontally and having their inner ends bent upwardly and journaled in said brackets, said arms extending outwardly and upwardly and having their free ends bent downwardly, draft devices pivotally supported on said free ends, and means to connect the inner ends of said arms one with the other to cause a simultaneous movement of both arms when either arm is moved.

4. In a draft equalizer, the combination of a support, brackets rigidly mounted thereon, arms adapted to swing horizontally and having their inner ends bent upwardly and journaled in said brackets, said arms extending outwardly and upwardly and having their free ends bent downwardly, arched draft devices pivotally supported on the free ends of said arms, bell-cranks secured to the inner ends of said arms, and means connecting said bell cranks one with the other to cause a simultaneous movement of both arms when either of said arms is moved.

In testimony whereof we affix our signatures, in presence of two witnesses.

LOLA V. PAUL,

*Administratrix of the estate of Wesley A. Paul, deceased.*

JOHN V. HOLSTEIN.

Witnesses:
 JESSIE SIMSER,
 W. G. DUFFIELD.